United States Patent Office 3,442,814
Patented May 6, 1969

3,442,814
GENERATION OF CHEMILUMINESCENT LIGHT
Desmond Sheehan, Northford, Conn., assignor to American Cyanamid Company, Stamford, Conn., a corporation of Maine
No Drawing. Filed Sept. 23, 1965, Ser. No. 489,763
Int. Cl. C09k 1/02; B01j 1/00
U.S. Cl. 252—188.3      16 Claims

ABSTRACT OF THE DISCLOSURE

A method for obtaining chemiluminescent light by the reaction of an oxalyl halide with an oxalic acid or a keto acid in the presence of a fluorescer and water, the chemiluminescent composition of such ingredients and components of some of the ingredients in the composition.

---

The present invention relates to novel compositions of matter and reactions for the direct generation of light from chemical energy. By "light" as referred to herein is meant electromagnetic radiation at wavelengths falling between about 350 m$\mu$ and about 800 m$\mu$.

The art of generating light from chemical energy, i.e., chemiluminescence, is continually in search of compositions which when reacted substantially improve the intensity and lifetime of life emission. Obviously, improved compositions are constantly in demand for use as signal devices, for area illumination, etc.

The art has known for some time that a solution of (1) oxalyl chloride, (2) hydrogen peroxide, and (3) a fluorescent compound generates a light whose life is very short (on the order of about 8 to 30 seconds) and whose intensity is not exceptional, i.e., whose intensity is of little practical utility. Numerous attempts have been made to improve this chemiluminescent composition and many others similar to it, but with little success.

According to a publication by Edward A. Chandross, the chemiluminescent reaction of oxalyl chloride may be represented as occurring by the following mechanism:

(1)

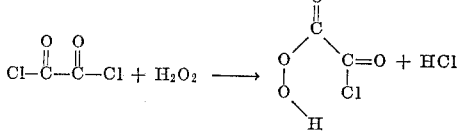

followed by reaction (2)

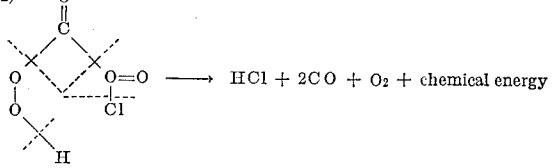

In the above reactions, a cyclic transition structure is formed, followed by a breakdown of the ring into hydrochloric acid, carbon monoxide, oxygen, and chemical energy.

The mechanism of the oxalyl chloride chemiluminescent reaction (as above represented by Chandross) requires solely (1): (a) oxalyl chloride and (b) hydrogen peroxide as necessary reactants to produce a chemical energy release; and (2) any diluent having sufficient solvent properties to form a solution of the above two critical reactants. The above Chandross reaction mechanism as represented by Chandross does *not* require water as a reactant and therefore would be entirely different and distinct from the mechanism of the invention disclosed herein in which water *is* a critical reactant, and in which hydrogen peroxide is *not a* critical reactant, as is discussed at length below.

The mechanisms by which chemiluminescent light may be generated are so poorly understood that it is not possible at present to predict those structures which convey the chemiluminescent property. This is amply illustrated by the phthalhydrazide series of compounds, some of which are chemiluminescent and some of which are not chemiluminescent (See A. Bernanose, "Bull. Soc. Chim. France," 17, 567 (1950)).

It is an object of this invention to obtain a chemiluminescent composition and a process employing said composition whereby a high efficiency may be obtained in the conversion of chemical energy into light.

Another object is to obtain a chemiluminescent compound which produces a light over an extended period of time.

Another object of this invention is to obtain a chemiluminescent composition which attains a light of substantially higher intensity than has been obtained with former chemiluminescent compositions.

Another object of this invention is to obtain a chemiluminescent composition which may be employed to obtain light by a process which is mechnically simple and which is economically inexpensive.

Another object of this invention is to obtain a chemiluminescent reactant which is stable over a long period of time and which may be subsequently reacted to obtain chemiluminescent light.

Another object of this invention is to obtain a chemiluminescent reactant which when reacted will obtain chemiluminescent light by a process which is not hazardous.

Another object of this invention is to obtain a chemiluminescent reactant which when employed in the presence of a fluorescent compound will produce chemiluminescent light.

We have unexpectedly discovered that the objects of this invention are obtained by admixing reactants including (1) an oxalyl halide, (2) sufficient diluent to form a solution of reactants, (3) at least a minor amount of water, (4) oxalic acid and/or a keto acid of the formula HO—CO—(CO)$_n$—CO—OH where $n$ is an integer from one up to about 10, and/or a hydrate of these compounds, and (5) a fluorescer. Unexpectedly, no peroxide compound is necessary to be employed to obtain the chemiluminescence.

If a hydrate of the acid is employed, the water is not a necessary reactant.

The term "chemiluminescent reactant" as used herein means a mixture which when in the presence of a suitable fluorescer will result in a chemiluminescent reaction (1) independently or (2) when reacted with other necessary reactants in the processes as disclosed herein.

The term "chemiluminescent composition" as used herein means a mixture which includes chemiluminescent reactants, which includes the presence of a suitable fluorescer, and which will result in chemiluminescence.

The term "admixing" as used herein means "reacting" or sufficiently bringing together component reactants to obtain a chemiluminescent reaction.

The term "hydrogen peroxide compound" includes (1) hydrogen peroxide and (2) hydrogen peroxide-producing compounds.

By "nonreactive diluent" is meant a diluent which will not react in a manner which will defeat the chemiluminescent reaction.

The term "diluent," as used herein, means a solvent or a vehicle which when employed as or with a solvent does not cause insolubility.

The term "solid," as used herein, refers to a state in which the materials are in the absence of a solvent such as tetrahydrofuran or other diluent, and the state of the material may be virtually in the form of a single solid state, or of lumps of ground or crushed particles, or of a powdery material.

The term "fluorescent compound" means (1) a compound which is a fluorescer and/or (2) a compound which is a fluorescer-precursor.

A fluorescer-precursor is a compound which under the chemiluminescent conditions of this invention reacts to form a fluorescer.

In the practice of the invention, the ratio of the oxalyl halide and oxalyl acid preferably is about a 1:1 ratio, but the ratio normally may range from about 1:2 to about 2:1. The preferred concentration for each of these reactants is from about $10^{-2}$ molar to about 1 molar. However these ratios and concentration ranges may vary considerably, depending upon the intensity of chemiluminescence desired. However it should be noted that when the concentration of oxalyl halide exceeds certain optimum percentages, the oxalyl halide becomes a quencher of chemiluminescence. The preferred oxalyl halide is oxalyl chloride, and the preferred acids are oxalic and/or oxalic acid dihydrate.

Typical diluents within the purview of the instant discovery are those (1) that do not readily react to frustrate the production of chemiluminescent light of this invention, and/or (2) which may be a liquid solution of any one or more of the essential reactants, such as a tetrahydrofuran solution of oxalic acid.

Water is a necessary reactant in the production of chemiluminescent light in the present invention. Moreover, water can be present as a supplemental solvent, but because the water tends to react with oxalyl chloride and to thereby quench the chemiluminescent reaction, it cannot be employed as the sole or major solvent. Also, some other hydrate may be employed with the anhydrous oxalic acid.

It should be noted htat if an oxalic acid hydrate is employed, the water of the hydrate is sufficient for the reaction, and no other water need be admixed.

The following are illustrative of the additional diluents or solvents which may be employed: noncyclic or cyclic ethers, such as diethyl ether, diamyl ether, diphenyl ether, anisole, tetrahydrofuran, dioxane, 1,2-dimethoxyethane, and the like; esters, such as ethyl acetate, propyl formate, amyl acetate, cyclohexyl acetate, dimethyl phthalate, diethyl phthalate, methyl benzoate, and the like; aromatic hydrocarbons, such as tertiary butyl benzene, benzene, xylene, toluene, and the like; and aliphatic hydrocarbons such as cyclohexane, hexane, pentane and the like.

The fluorescent compounds contemplated herein are numerous and they may be defined broadly as those which do not readily react with ketodiacid or oxalyl halides. Typical suitable fluorescent compounds for use in the present invention are those which have a spectral emission falling between 330 millimicrons and 800 millimicrons and which are at least partially soluble in any of the above diluents, if such diluent is employed. Among these are the conjugated polycyclic aromatic compounds having at least three fused rings, such as: anthracene, substituted anthracene, benzanthracene, phenanthrene, substituted phenanthrene, naphthacene, substituted naphthacene, pentacene, substituted pentacene, and the like. Typical substituents for all of these are phenyl, lower alkyl, chlorine, bromine, cyano, alkoxy ($C_1$–$C_{16}$), and other like substituents which do not interfere with the light-generating reaction contemplated herein.

Numerous other fluorescent compounds having the properties given hereinabove are well-known in the art, such as, for example, trans-stilbene, 1,3-diphenyl isobenzofuran, pentaphenyl phosphole oxide, 10-methyl-9-acridanone, and the like. Many of these are fully described in Fluorescence and Phosphorescence, by Peter Pringsheim, Interscience Publishers, Inc., New York, N.Y., 1949. While only typical fluorescent compounds are listed hereinabove, the person skilled in the art is fully aware of the fact that this invention is not so restricted and that numerous other fluorescent compounds having similar properties are contemplated for use herein.

It should be noted, however, that although a fluorescent compound is necessary to obtain the production of light, the fluorescent compound is not necessary to obtain a chemical reaction and chemical energy release.

The fluorescent compound is normally present in the range from about $10^{-5}$ to 5, preferably $10^{-4}$ to $10^{-1}$ molar and the diluent employed must be present in a sufficient amount to form a solution of the reactants involved in the chemiluminescent reaction.

The chemiluminescent composition of this invention which obtains chemiluminescent light emission upon the admixing of the ingredients of the composition, may be admixed in a single stage of admixing or in a sequence of steps of admixing the separate ingredients. Accordingly alternative compositions may be prepared which may be stored over an extended period of time and which may be admixed with the final ingredient at a time when the chemiluminescent lighting is desired. For example, the composition may be a substantially anhydrous solid composition which includes (1) a fluorescer compound, and (2) anhydrous oxalic acid. The addition of oxalyl chloride and an aqueous material or diluent would cause the chemiluminescent process to proceed substantially instantly. Another example would be a composition which includes (1) water in the form of oxalic acid dihydrate, and (2) a fluorescer. The addition of oxalyl chloride and a diluent would produce chemiluminescence. An alternative composition would be a composition which includes (1) an oxalyl halide, (2) a fluorescer, and (3) oxalic acid dihydrate with separate solvents which are immiscible but which are in contact with one another and with the oxalyl halide in a different solvent than the oxalic acid dihydrate. Thereafter, a diluent and a fluorescer would be admixed therewith. Another alternative composition would be a composition which includes a fluorescent compound, oxalic acid or oxalic acid hydrate and a diluent, but which does not include the oxalyl halide. The preferred compositions which would be less than all necessary components to produce a chemiluminescent light, and would be a composition which would be substantially stable to a practical degree over an extended period of time; otherwise there would be no real advantage in forming a chemiluminescent reactant to be employed in a subsequent chemiluminescent reaction. Accordingly if a composition is prepared which includes the both oxalyl chloride and "free water," or which includes oxalyl chloride, "bound" water (i.e. a hydrate) and a diluent, it is necessary to relatively promptly (preferably instantaneously) thereafter admix the any other necessary reactants of this invention before the water reacts with an oxalyl halide. It also would be within the scope of the invention to employ a miscellaneous hydrate which upon adition of a nonaqueous diluent would provide the necessary water to react with an anhydrous oxalic acid, and with the other necessary reactants.

It is also within the scope of this invention to employ separate but miscible or immiscible diluents, part of the necessary reactants being in one diluent and the remaining reactants or less than all the required remaining reactants being in the other diluent, whereby when the separate diluents are admixed or are otherwise in contact with each other, chemiluminescence is obtained at the interface of the respective diluents.

Also, the use of a single diluent in which less than all reactants are soluble is contemplated, whereby upon contact or addition of the insoluble reactant, chemiluminescence is obtained at the contacting surface of the insoluble reactant.

The chemiluminescent reaction process of this invention may be carried out at any temperature below boiling. Temperature is not critical.

The order of addition of the reactants in the chemiluminescent reaction is not critical, except as noted above regarding water addition. Additionally, it is desirable to admix the required water concurrently with the mixing of the preferred oxalyl chloride.

The wavelengths of the light emitted by chemiluminescence of the compositions of this invention, i.e., the color of the light emitted, may be varied by the addition of any one or more energy transfer agents (fluorescers) such as the known fluorescent compounds discussed at length above.

The wavelength of the light emitted by the composition of this invention will vary, depending upon the particular fluorescent component employed in the reaction mixture.

In the practice of the process of this invention to obtain chemiluminescent light, the mechanism involved is not fully understood.

It is clear that no apparent relationships exist in the mechanism of this invention, as represented above, and the mechanism of oxalyl chloride reaction as represented by Chandross, discussed above at length. This is clear since the above mentioned Chandross reaction requires hydrogen peroxide while the present invention does not require hydrogen peroxide.

Pursuant to the present invention disclosed herein, very intense light is generated and the light emissions last anywhere from about 16 to 60 times longer than that of the art-known aqueous composition described hereinbefore, such as oxalyl chloride.

The following examples are intended to illustrate the present invention are in no way intended to limit the invention except as limited in the appended claims.

Example 1

In an argon atmosphere a 1 molar solution (25 ml.) of oxalyl chloride in tetrahydrofuran is mixed with a 1 molar solution (25 ml.) of oxalic acid dihydrate in tetrahydrofuran containing 3–5 mg. of rubrene. An intense yellow light emission is observed.

This example illustrates the invention.

Example 2

In an argon atmosphere a 1 molar solution (25 ml.) of oxalyl chloride in tetrahydrofuran is mixed with a 1 molar solution (25 ml.) of sublimed anhydrous oxalic acid in tetrahydrofuran containing 3–5 mg. or rebrene. There is no detectable light emission. A few drops of water are added within one minute of the original mixing. There is light emission.

This example demonstrates that anhydrous oxalic acid will not, in the absence of water, produce chemiluminescent light. The example thus illustrates the criticality of the presence of water.

Example 3

The entire process of Example 1, is repeated with the water being added 5 minutes after the mixing of the oxalyl chloride and anhydrous oxalic acid. There is no detectable light emission.

This example demonstrates that when anhydrous oxalic acid is employed, that when the oxalyl chloride is admixed, the water must be also admixed within a short time thereafter to avoid inoperativeness of the chemiluminescent reaction. The example also demonstrates the criticality of water.

Example 4

A 1 molar solution (25 ml.) of oxalyl chloride in tetrahydrofuran is mixed with a one molar soltuion (25 ml.) of anhydrous oxalic acid in tetrahydrofuran containing a few mg. of rubrene. There is no detectable light emission. Approximately 0.2 ml. of methanol is added. There is no detectable emission.

This example demonstrates (1) that water cannot be totally replaced by alcohol, and (2) that water is a critical reactant.

Example 5

A one molar solution (25 ml.) of oxalyl chloride in tetrahydrofuran is mixed with a one molar solution of ketomalonic acid (HO—CO—CO—CO—OH) in tetrahydrofuran containing a few mg. of rebrene and a minor amount of water. Chemiluminescent light is observed.

This exeriment demonstrates that keto acids of the type defined above are within the scope of this invention.

Example 6

A one molar solution (25 ml.) of fumaryl chloride (Cl—CO—C=C—CO—Cl) in tetrahydrofuran is mixed with a one molar solution of oxalic acid in tetrahydrofuran containing a few mg. of rubrene and a minor amount of water. No chemiluminescent light is observed.

This example demonstrates that the employment of oxalyl chloride is critical to the invention and that other acid halide components cannot be substituted therefore.

Example 7

Example 7 is repeated employing picolyl (C₆H₅—CO—Cl), in place of the fumaryl chloride. No chemiluminescent light is observed.

This example further demonstrates that the employment of oxalyl halide is critical to this invention and that other acid halide compounds cannot be substituted therefore.

Example 8

Oxalyl chloride, oxalic acid and a fluorescer are admixed neat, in the presence of a trace amount of water and in the absence of other diluent than the oxalyl chloride itself. No chemiluminescent light is observed.

This experiment demonstrates that oxalyl halide when present in an excessive amount is a quencher of the chemiluminescent reaction.

It is within the scope of this invention to make such modifications of the compositions and processes disclosed herein as would be obvious to a person of ordinary skill in this art, and it is to be understood that the examples illustrating this invention are intended to limit the invention only insofar as is stated in the specification and as the following claims are limited. Also, it is within the scope of this invention to form an apparatus such as a container, such as, (1) an insoluble or (2) dissolvable capsule in which the reactant of this invention is enclosed for subsequent reaction with the other ingredients necessary to produce chemiluminescent energy and light.

I claim:

1. A chemiluminescent reactant consisting of non-peroxide ingredients comprising at least two members selected from the group consisting of (A) a reactant selected from the group consisting of (1) oxalic acid, (2) a hydrate of oxalic acid, (3) an acid of the keto structural formula:

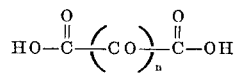

where $n$ is an integer from one up to about 10, and (4) a hydrate of a compound of the above keto structural formula, (B) an oxalyl halide, and (C) a fluorescer.

2. A chemiluminescent reactant consisting of a non-peroxide ingredient comprising a fluoroescent compound and an acid reactant selected from the group consisting of (1) oxalic acid, (2) a hydrate of oxalic acid, (3) an acid of the keto structural formula:

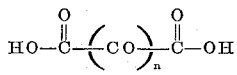

where $n$ is an integer from one up to about 10, and (4) a hydrate of a compound of the above keto structural formula.

3. A chemiluminescent reactant comprising (a) a diluent and (b) a reactant selected from the group consisting of (1) oxalic acid, (2) a hydrate of oxalic acid, (3) an acid of the keto structural formula:

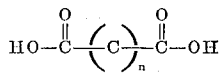

wherein $n$ is an integer from one up to about 10, (4) a hydrate of a compound of the above keto structural formula, and (5) a fluorescent compound.

4. A composition according to claim 3, in which said diluent includes at least a minor amount of water.

5. A composition according to claim 4, in which at least some of the necessary reactants are substantially insoluble in said diluent.

6. A chemiluminescent composition consisting of nonperoxide ingredients comprising (1) a reactant selected from the group consisting of (a) oxalic acid, (b) a hydrate of oxalic acid, (c) and acid of the keto structural formula:

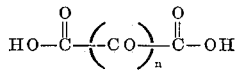

where $n$ is an integer from one up to about 10, (d) a hydrate of a compound of the above keto structural formula, (2) oxalyl halide, (3) a fluorescent compound, (4) a diluent, said composition including at least a minor amount of water and said composition including solely nonperoxide compounds.

7. An anhydrous chemiluminescent reactant consisting of nonperoxide ingredients comprising a diluent, a fluorescent compound, and anhydrous oxalic acid.

8. A chemiluminescent composition according to claim 7, which said diluent includes at least a minor amount of water.

9. A chemiluminescent composition consisting of nonperoxide ingredients comprising (1) oxalic acid dihydrate, (2) oxalyl halide, (3) a fluorescent compound, (4) a diluent, said composition including at least a minor amount of water and said composition including solely nonperoxide compounds.

10. A process comprising sufficiently mixing nonperoxide reactants to produce chemiluminescent light in the absence of a peroxide compound, said reactants comprising (1) oxalyl halide, (2) a fluorescer, (3) a diluent, and (4) a reactant selected from the group consisting of (a) oxalic acid, (b) a hydrate of oxalic acid, (c) an acid of the keto structural formula:

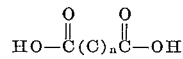

where $n$ is an integer from one up to about 10, (d) a hydrate of a compound of the above keto structural formula, said reactants including at least a minor amount of water.

11. A process according to claim 10, in which said oxalyl halide comprises oxalyl chloride.

12. A process according to claim 11, in which said acid reactant comprises oxalic acid.

13. A process according to claim 12, in which said acid reactant comprises oxalic acid dihydrate.

14. A chemiluminescent reactant consisting of solid nonperoxide ingredients comprising at least two members selected from the group consisting of (A) a reactant selected from the group consisting of (1) oxalic acid, (2) a hydrate of oxalic acid, (3) an acid of the keto structural formula:

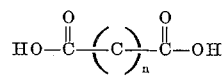

where $n$ is an integer from one up to about 10, and (4) a hydrate of a compound of the above keto structural formula, (B) a solid fluorescent compound, and (C) an oxalyl halide.

15. A reactant as in claim 1 including in addition a diluent.

16. An article of manufacture comprising a container containing nonperoxide ingredients comprising at least 2 members selected from the group consisting of (A) a reactant selected from the group consisting of (1) oxalic acid, (2) a hydrate of oxalic acid, (3) an acid of the keto structural formula:

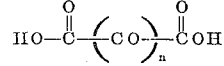

where $n$ is an integer from one up to about 10, and (4) a hydrate of a compound of the above keto structural formula, (B) an oxalyl halide, and (C) a fluorescer.

References Cited

UNITED STATES PATENTS 1,554,483  9/1925  Bailey et al. _____ 252—142

OTHER REFERENCES

E. A. Chandross: "A New Chemiluminescent System," Tetrahedron Letters No. 12, pp. 761–65 (1963).

LEON D. ROSDOL *Primary Examiner.*

J. D. WELSH, *Assistant Examiner.*

U.S. Cl. X.R.

252—301.2, 301.3, 408